United States Patent [19]

Pascall

[11] Patent Number: 4,776,563

[45] Date of Patent: Oct. 11, 1988

[54] THROTTLE BODY CONTROL ARRANGEMENT

[75] Inventor: Keith L. Pascall, Birmingham, England

[73] Assignee: Lucas Industries PLC, West Midlands, England

[21] Appl. No.: 62,746

[22] Filed: Jun. 16, 1987

[30] Foreign Application Priority Data

Jun. 20, 1986 [GB] United Kingdom ................. 8615117

[51] Int. Cl.⁴ ................................................ F16K 31/05

[52] U.S. Cl. ................................ 251/129.03; 123/399; 123/396

[58] Field of Search .................... 251/129.03; 123/396, 123/397, 398, 399

[56] References Cited

U.S. PATENT DOCUMENTS 3,515,250 6/1970 Cantalupo .................. 251/129.03 X
4,429,591 2/1984 Zuch et al. ................. 251/129.03 X

FOREIGN PATENT DOCUMENTS 689211 3/1953 United Kingdom ........... 251/129.03

*Primary Examiner*—Arnold Rosenthal
*Attorney, Agent, or Firm*—Nixon & Vanderhye

[57] ABSTRACT

A throttle body butterfly valve controlled by electrical signals in a drive-by-wire arrangement includes a mechanical coupling cable (9) arranged to close the throttle if the valve is locked in the open throttle condition.

8 Claims, 2 Drawing Sheets

THROTTLE BODY CONTROL ARRANGEMENT

This invention relates to a fail safe control arrangement for a throttle body butterfly valve.

Conventionally throttle body butterfly valves on automobiles are controlled by a throttle control member, for example an accelerator pedal, by way of a direct mechanical connection in the form of a cable or lever arrangement, depression of the accelerator causing the mechanical connection to pull the butterfly valve into an open throttle condition, the butterfly valve being returned to a relatively closed throttle condition by means of a spring when the accelerator pedal is released.

Recently a new control arrangement has been proposed in which the butterfly valve is controlled by means of electrical signals transmitted over a transmission wire in response to operation of a throttle control member, such an arrangement being known (at least in the U.S.A.) as a "drive by wire" arrangement. The electrical signals transmitted to the throttle body control an electric motor which operates the butterfly valve by way of a gear box, the motor serving to urge the butterfly valve in both the open throttle and closed throttle directions.

A difficulty which can arise with such a drive by wire control arrangement is that in the event of a fault occurring the butterfly valve can become locked in an open throttle condition, this being particularly the case if the fault is seizure of the gear box or motor operating the butterfly valve.

According to this invention there is provided a butterfly valve control arrangement comprising a drive member adapted to be controlled by electrical signals transmitted under the control of a throttle control member; a driven member for connection to the butterfly valve and coupled to the drive member by way of a clutch such that in normal operation control of the drive member of the electrical signals effects corresponding control of the driven member and thus of the butterfly valve characterised by mechanical coupling means connected to the driven member and adapted to be connected to the throttle control member and when so connected operative in the event that movement of the throttle control member in the throttle closing direction does not produce corresponding control of the butterfly valve by means of the electrical signals, to move the driven member in the throttle closing direction with simultaneous breaking of the clutch coupling between the drive and driven members.

With the control arrangement of this invention in the event of a fault occurring in the normal drive by wire arrangement the mechanical coupling means which during normal operation serves no purpose, provides a coupling between the throttle operating member, for example the accelerator pedal, and the butterfly valve which on release of the throttle operating member and its consequential return to a rest condition serves to pull the butterfly valve into a closed throttle condition, such movement of the butterfly valve being possible because of the breaking of the clutch coupling in the control arrangement. Thus, the mechanical coupling means which can be a cable, serves to pull the butterfly valve into a closed throttle condition in the event of a fault.

Preferably the drive member and the driven member are coupled by means of a clutch having complementary engaging surfaces which are urged together by urging means such as a compression spring, and which in the event of a fault movement of the driven member in the throttle closing direction is arranged so that the members are moved apart against the action of the urging means to break the coupling between the drive member and the driven member. The engaging surfaces preferably comprise a pointed concave surface and a corresponding pointed convex surface; preferably the included angle ranges from about 100° to about 170°. The faces may be shaped e.g. radiused, for ease of coupling and decoupling.

The control arrangement of the invention may be powered by an electric motor and an associated gear box but the gear box may be omitted and the drive member is then directly connected to the spindle of the electric motor.

This invention will now be described by way of example with reference to the drawings, in which.

Figure 1:
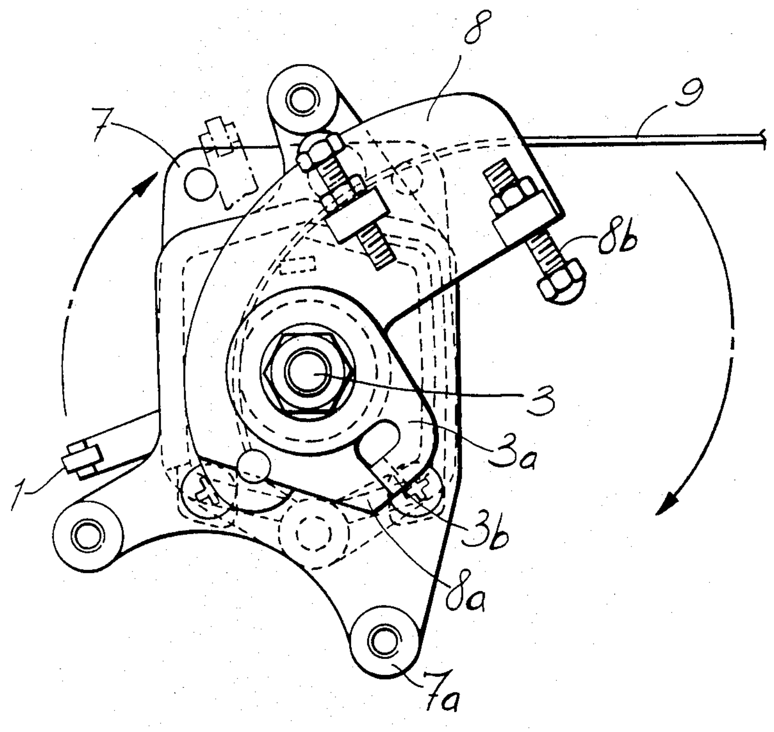
FIG. 1 is a top plan view of an arrangement according to the invention.
Figure 2:
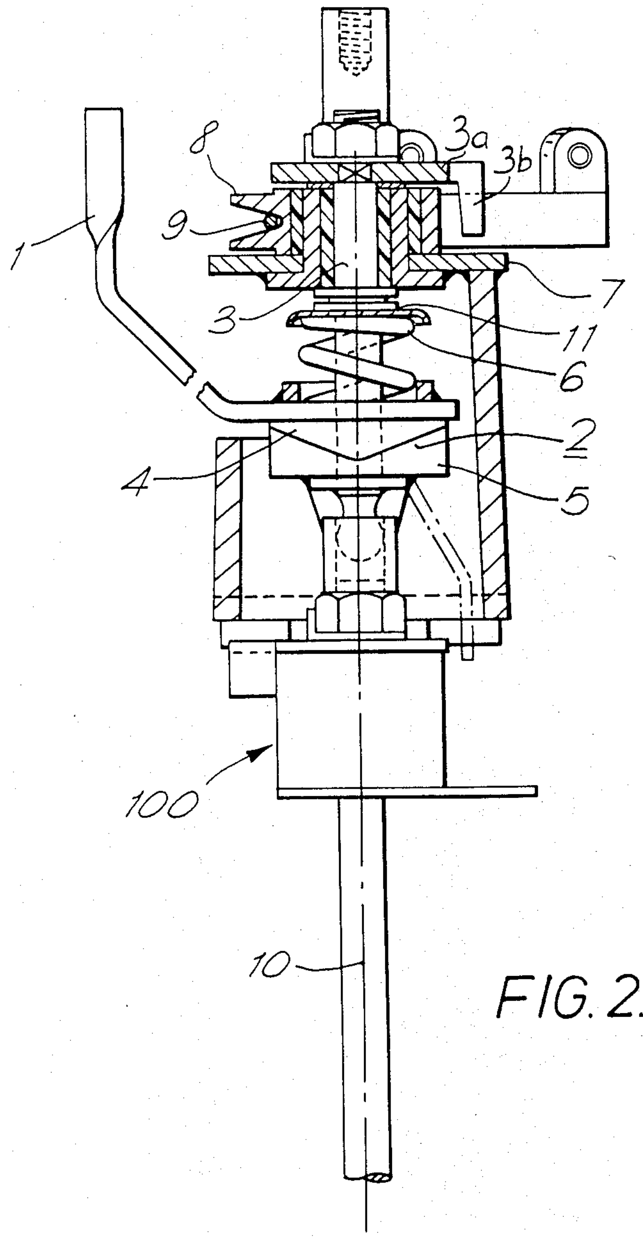
FIG. 2 is a part vertical sectional view through the arrangement of FIG. 1.

The arrangement comprises a drive member 1 in the form of a lever mounted for rotation about the control vertical axis 10 of the arrangement, the lever 1 being moved in response to electrical signals transmitted under the control of a throttle control member (not shown) by means of an electric motor and an optional associated gear box (neither shown). The arrangement also comprises a driven member 3 in the form of a spindle mounted for rotation about the axis 10, the spindle being connected to a throttle body 100 to control the butterfly valve position.

The drive member 1 is coupled to the driven member 3 by means of a clutch 2 comprising a first member 4 mounted on the drive member 1 and having a pointed convex face which engages in a corresponding pointed concave face of a second member 5 mounted on the driven member 3. A compression spring 6 mounted about the driven member 3 and acting between the first clutch member 4 and a fixed collar 11, serves to hold the clutch members 4 and 5 in engagement such that movement of the drive member 1 in response to electrical signals transmitted by the throttle control member causes corresponding movement of the driven member 3 and thus appropriate control of the butterfly valve position of the throttle body 100.

The rotating surfaces of the clutch members 4 and 5 are shaped such that the drive member 1 can rotate the driven member 3 in either direction when the clutch is engaged, and such that if the driven member 3 is used as a drive member and is urged in the throttle closing direction the clutch member 4 is urged away from the clutch member 5 against the action of the spring 6 thereby allowing the required movement of the driven member 3 to take the place and move the butterfly valve within the throttle body 100 to a closed throttle condition even 1f the drive member 1 cannot move, for example because the associated motor or gear box has become jammed.

Movement of the driven member 3 as a drive member in the event of a fault is provided by means of a cam 8 mounted on the body 7.

A further rotatable member 3_a_ is located above the cam 8 and is secured to the driven member 3 by any suitable means. A bearing surface is present between the underside of the member 3_a_ and the opposing portion of the body 7. A lug portion 3_b_ of the member 3_a_ extends downwardly and cooperates with an opposing portion 8*a* of the cam member 8. The cam 8 is connected by a mechanical coupling means, in the spring loaded form of a cable 9, to the spring loaded throttle control member (not shown) associated with the throttle body 100.

In use, the motor rotates both the drive 1 and driven members 3, which move in a clockwise direction under the influence of the spring loaded throttle control member acting along the cable 9 through an approximate 90° arc to a fully open condition, shown in phantom in FIG. 1. At the same time, the cam 8 is rotated through the same angle, with the round headed nut 8*b* coming to rest against an upwardly extending lug 7*a* of the body 7.

In the event of a fault in the normal operation of the throttle body valve control arrangement, e.g., the motor associated with the drive member 1 jamming with the drive member 1 in an open condition, then upon release of the throttle control member, the butterfly valve is moved to the throttle closed condition. Specifically, upon such release, the cable 9 is no longer under tension, and the cam member 8 rotates in an anticlockwise direction to return to the position shown in FIG. 1. As the cam member 8 rotates, the portion 8*a* cooperates with an engages lug 3*b* on the member 3*a* to simultaneously rotate the driven member 3 in the same direction.

As the concave clutch member 5 rotates, the opposing (and not stationary as a result of jamming) convex clutch member 4 rides upwards against the bias of the compression spring 6 and the engagement between the two clutch members is broken, and thus the connection between the driven member 3 and drive member 1 is also broken.

The control arrangement above described can be set up to provide for limited opening of the throttle butterfly valve of the throttle body while a fault condition exists in order to give a 'limp home' capability.

Because of the engagement of the facing surfaces of the first and second members 4,5, in the event of a brief fault condition the control arrangement will reset itself to the normal operating position.

I claim:

1. A control arrangement for a butterfly valve comprising a drive member adapted to be controlled by electrical signals transmitted under the control of a throttle control member; a driven member connected to the butterfly valve and coupled to the drive member by a clutch coupling, such that in normal operation, control of the drive member by the electrical signals effects corresponding control of the driven member and thus of the butterfly valve, and further including means operatively connected between the driven member and the throttle control member for moving the driven member in a throttle closing direction with simultaneous breaking of the clutch coupling between the drive and driven members in response to a fault wherein movement of the throttle control member in the throttle closing direction does not produce corresponding control of the butterfly valve by the electrical signals.

2. An arrangement according to claim 1 wherein said means comprises a cable.

3. An arrangement according to claim 2 wherein said means further comprises a cam rotatably mounted on a body portion of the butterfly valve, said cable extending between said cam and said throttle control member.

4. An arrangement according to claim 1 wherein the clutch coupling comprises a first member mounted on the drive member and a second member mounted on the driven member and a spring serving to urge the first and second clutch members into engagement, the first and second clutch members having co-operating surfaces which in normal operation provide a coupling between the drive member and the driven member such that movement of the drive member causes corresponding movement of the driven member, and which in the event of said fault and movement of the driven member in the throttle closing direction by the mechanical coupling means, cause movement of the first clutch member away from the second clutch member against the action of the spring thereby breaking the coupling between the drive member and the driven member.

5. An arrangement according to claim 1, wherein the electrical signals control the drive member by way of an electric motor.

6. An arrangement according to claim 1, wherein the movement of the drive member and the movement of the driven member is rotary, the movements being about a common axis.

7. An arrangement as defined in claim 3 wherein movement of the throttle control member in a throttle opening direction causes said cam to rotate in a throttle opening direction, and movement of the throttle control member in a throttle closing direction causes said cam to rotate in a throttle closing direction; said means further including a rotatable member mounted on said driven member for rotation therewith, said rotatable member provided with a lug portion for engaging said cam and enabling said cam, upon occurrence of said fault, to drive said rotatable member and said driven member in the throttle closing direction.

8. An arrangement according to claim 7 wherein the clutch coupling comprises a first member mounted on the drive member and a second member mounted on the driven member and a spring serving to urge the first and second clutch members into engagement, the first and second clutch members having co-operating surfaces which in normal operation provide a coupling between the drive member and the driven member such that movement of the drive member causes corresponding movement of the driven member, and which in the event of said fault and movement of the driven member in the throttle closing direction by said means, cause movement of the first clutch member away from the second clutch member against the action of the spring thereby breaking the coupling between the drive member and the driven member.

* * * * *